Figures 1, 2:
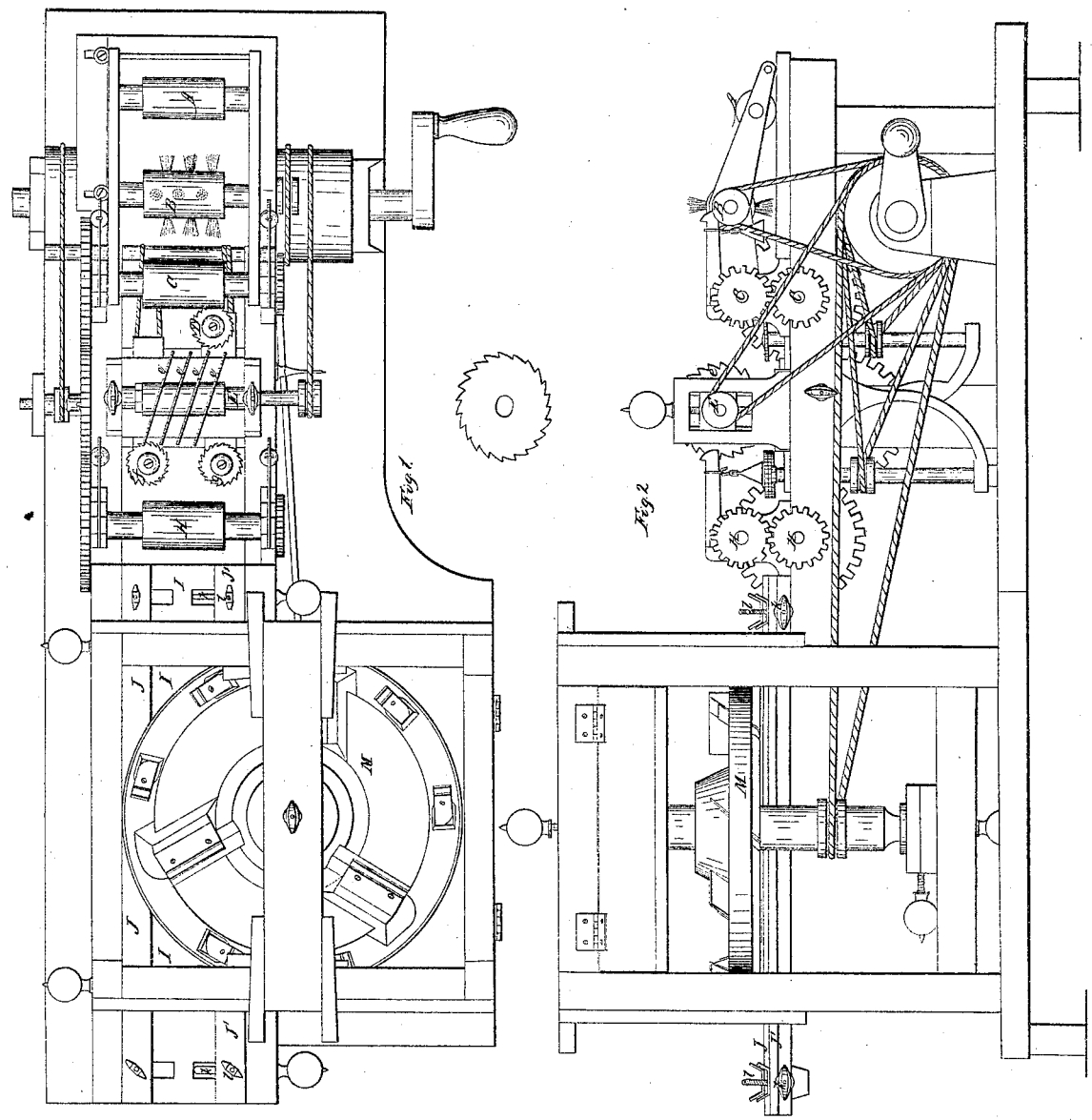

Patton & Fergus,
Planing and Matching Machine,

Nº 8,612.  Patented Dec. 23, 1851.

UNITED STATES PATENT OFFICE.

JAS. M. PATTON AND WM. FERGUS, OF PHILADELPHIA, PENNSYLVANIA, ASSIGNORS TO JOHN C. DA COSTA.

CUTTER FOR PLANING-MACHINES.

Specification of Letters Patent No. 8,612, dated December 23, 1851.

*To all whom it may concern:*

Be it known that we, JAMES M. PATTON and WILLIAM F. FERGUS, of the city and county of Philadelphia and State of Pennsylvania, have invented a new and useful Improvement in Planing-Machines; and we do hereby declare that the following is a full and exact description thereof, reference being had to the accompanying drawings, making a part of this specification.

Figure 1 is a top view, and Fig. 2, a side elevation of a planing machine embodying our improvement, and Fig. 3, a detached portion thereof.

Similar letters indicate like parts in all the figures.

The nature of our invention consists in the peculiar construction and operation of a cutting instrument to be employed in planing machines for reducing the boards to a uniform thickness, and in a modified form, for reducing the boards to a uniform width, and for tonguing and grooving them. This said cutting instrument, is composed of one or more elliptical saws e, e, secured on an arbor E, in positions of sufficient obliquity thereto to cause every portion of the periphery of each saw to be at the same perpendicular distance from the axis of their said arbor; for the purpose of producing, at the same time and in the same plane, a rotating and a laterally reciprocating action of the teeth of the saws upon a board when brought in contact therewith.

We are aware that circular saws have been placed in oblique positions upon arbors; and that when so arranged, their teeth describe ellipses as they are rotated. Our improved cutting instruments may be combined with any description of planing machine.

The accompanying drawings represent our improved cutting instruments as being combined with a machine for the purpose of first reducing boards to a uniform width, then reducing them to a uniform thickness, and then tonguing and grooving them preliminary to their being operated upon by an improved bramah planing wheel which brings the boards to a smooth surface.

The boards are fed into the machine under the roller A, and the cleaning brush B, to the feeding rollers C, C; as the boards emerge from the rollers C, C, they are acted upon by the edging saw D; they then pass under the cutting instrument E, e, e, e &c, which reduces them to a uniform thickness; and between this instrument and the feeding rollers H, H, the boards are acted upon by the grooving cutter f, and the tonguing cutters g, g.

From the feeding rollers H, H, the boards are carried under the smoothing bramah planing wheel M, and thence out of the machine. The bramah planing wheel may be constructed in any well-known or usual manner; and the planks may be kept in place while being operated upon by the said planing wheel, in any well known or usual manner.

We do not claim the formation of cutters by placing circular saws obliquely upon their arbors, as this has been done before; but What we do claim as our invention and desire to secure by Letters Patent, is—

The constructing of a cutting instrument for operating upon lumber, of one or more elliptical shaped saw or saws placed upon an arbor in positions so oblique to the direction of its axis as to bring every portion of the periphery of the said saw or saws into the same perpendicular distance from the said axis of their arbor, by which the teeth of the said saw or saws are made to perform a combined rotary and laterally reciprocating cutting action in the same circle of rotation, substantially in the manner herein set forth.

JAS. M. PATTON.
WM. F. FERGUS.

Witnesses:
J. S. BROWN,
WM. DENNIS.